Figure 1:
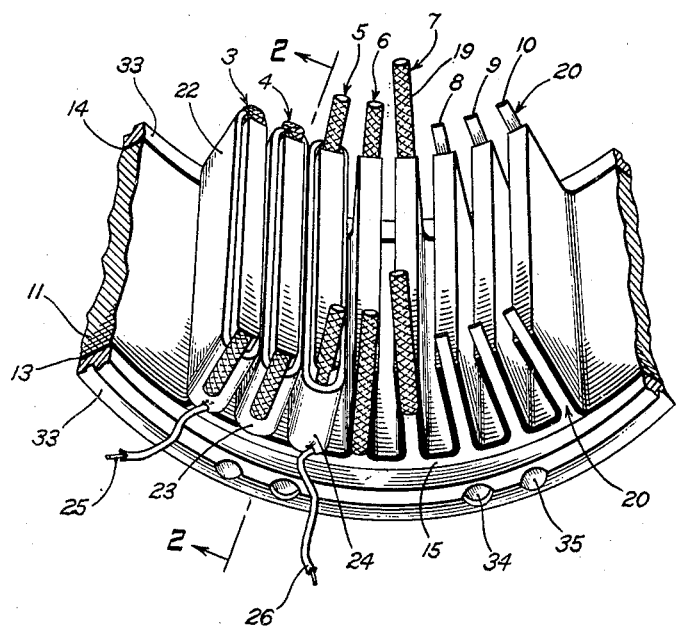

Oct. 24, 1939.     J. GARTNER     2,177,563
ELECTRICAL CONDUCTOR
Filed Oct. 25, 1937

INVENTOR.
John Gartner
BY Martin J. Finnegan
ATTORNEY.

Patented Oct. 24, 1939

2,177,563

UNITED STATES PATENT OFFICE 2,177,563

ELECTRICAL CONDUCTOR

John Gartner, New York, N. Y., assignor to Eclipse Aviation Corporation, East Orange, N. J., a corporation of New Jersey Application October 25, 1937, Serial No. 170,978

4 Claims. (Cl. 171—252)

This invention relates to electrical conductors, and particularly to the installation and retention of electrical conductors on polar projections, or "teeth" of magnetic elements, such as the stator or rotor assembly of a dynamo electric machine.

The object of the invention is to improve the security of retention of the electrical conductors, as well as to improve the installation methods and retaining means for such conductors.

In the drawing I have shown a portion of an alternating current machine with the invention incorporated therein, but it is to be understood that the invention goes beyond the illustrated embodiment, and extends to the outer limits of the territory embraced in the appended claims.

Figure 2:
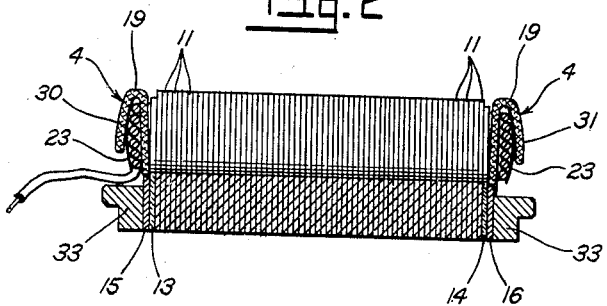

In the drawing:

Fig. 1 is a perspective view of a laminated, multi-tooth generator or motor element, with the several stages of winding installation indicated thereon; and Fig. 2 is a sectional view along line 2—2 of Fig. 1.

Reference characters 3 to 10, inclusive, designate eight successive "poles", or teeth, of the magnetic assembly, each "pole" or tooth being composed of a plurality of juxtaposed laminae 11 of identically shaped stampings from magnetic material, the outer laminae being faced with correspondingly shaped non-conducting bands 13 and 14. This having been done, I then apply to the assembly, at either side thereof, a correspondingly shaped retainer band (see 15 and 16) of non-magnetic, but flexible and resilient material such as brass, copper, or the like. To each tooth or finger of each retainer band I apply a sleeve (see 19) of suitable flexible, non-conducting fabric, the fingers 20 and the sleeves 19 being of somewhat longer extent, as shown, than the magnetic "poles" or teeth, for a purpose presently to appear.

Having applied sleeves 19, I may then wind the "poles" with the insulated conductors (as shown at 22, 23, and 24 by way of illustration of all) constituting part of the stator or rotor winding of the machine, leaving a free end (see 25 and 26) on each winding for connection to the source or outlet of the current. The sleeved fingers 20 may now be bent backward over the outer ends of each conductor coil, as indicated at 30 and 31 for coils 22 and 23, and a firm locking of the coils to the polar teeth is thus effected, thereby precluding the possibility of subsequent relative movement between coils and teeth, in service. However, should inspection or removal of particular coils be desired at any subsequent time, this can readily be effected, by temporarily restraightening the fingers 20.

End rings 33, perforated to receive positioning dowels at 34 and through-bolts at 35, complete the assembly.

What I claim is:

1. The combination with a set of magnetic polepieces, of a plurality of integrated flexible non-magnetic strips positioned along the end surfaces of said pole pieces with their free ends bent backwardly into approximate parallelism with respect to said polar end surfaces, and conductors coiled on said pole pieces outside said non-magnetic strips, but inside the backwardly bent free ends of said strips, and held in position thereby.

2. The combination with a set of magnetic pole pieces, of flexible non-magnetic strips positioned along the end surfaces of said pole pieces said pieces having backwardly bent end portions extending beyond said polar end surfaces, a sleeve of insulating fabric around each strip, at its free end, and conductors coiled on said pole pieces outside said non-magnetic strips, but inside the backwardly bent free ends of said strips, and held in position thereby.

3. The combination with a set of magnetic pole pieces, of a pair of non-magnetic rings each having flexible projections positioned along the end surfaces of said pole pieces with their free ends bent backwardly into approximate parallelism with respect to said polar end surfaces, and conductors coiled on said pole pieces outside said non-magnetic projections, but inside the backwardly bent free ends of said projections, and held in position thereby.

4. The combination with a set of magnetic pole pieces, of flexible non-magnetic strips positioned along the end surfaces of said pole pieces, said pieces having backwardly bent end portions extending beyond said polar end surfaces, and conductors coiled on said pole pieces outside said non-magnetic strips, but inside the backwardly bent free ends of said strips, and held in position thereby.

JOHN GARTNER.